Patented Dec. 3, 1935

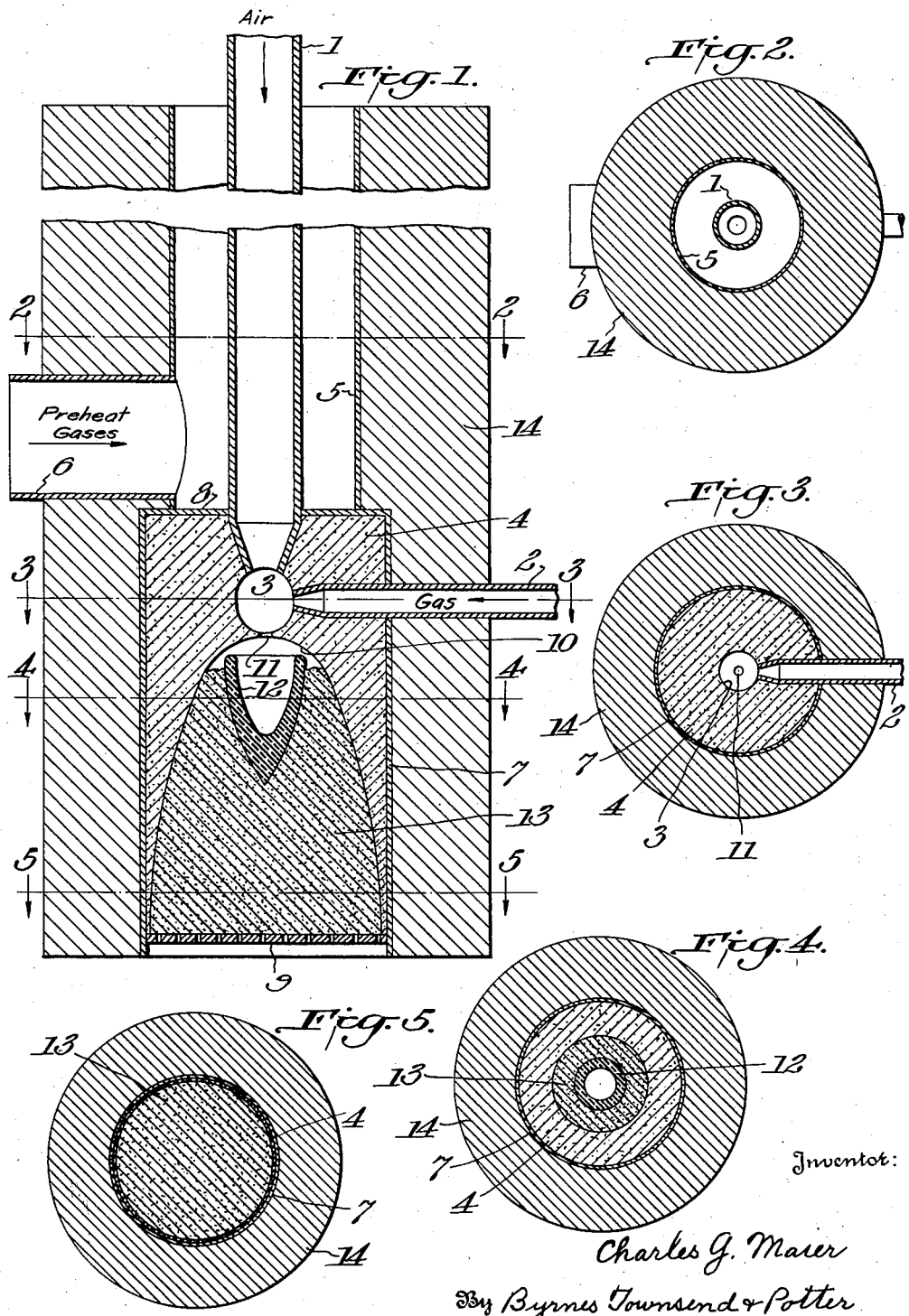

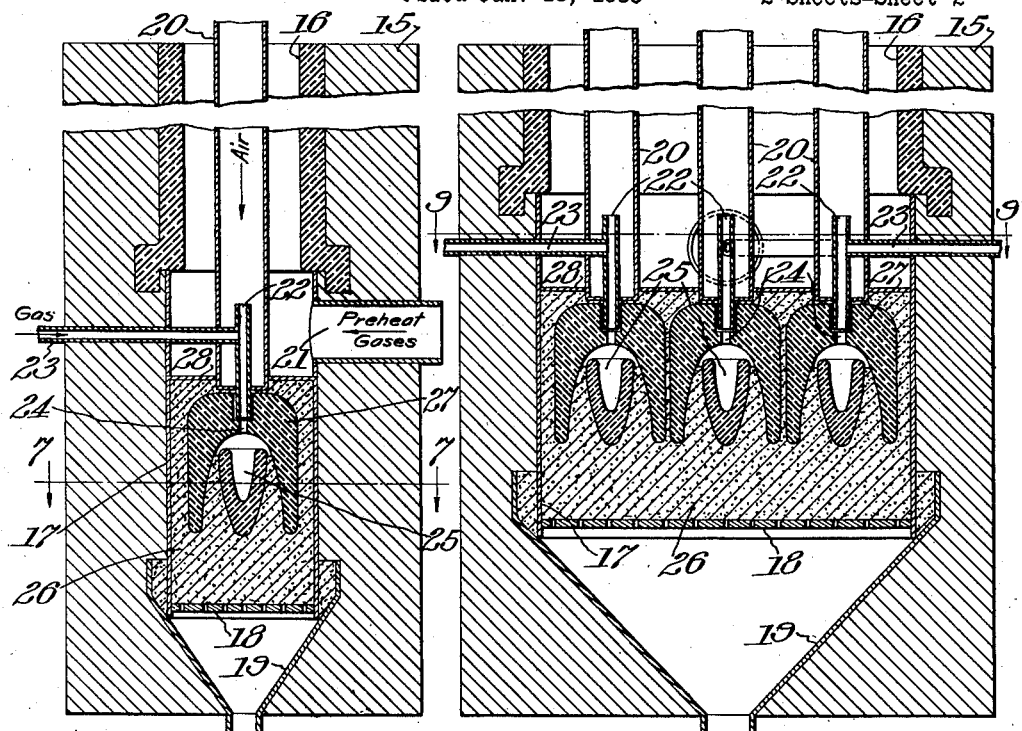
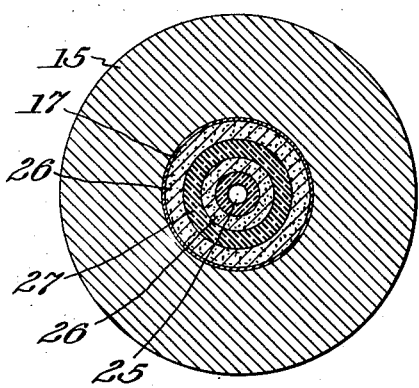
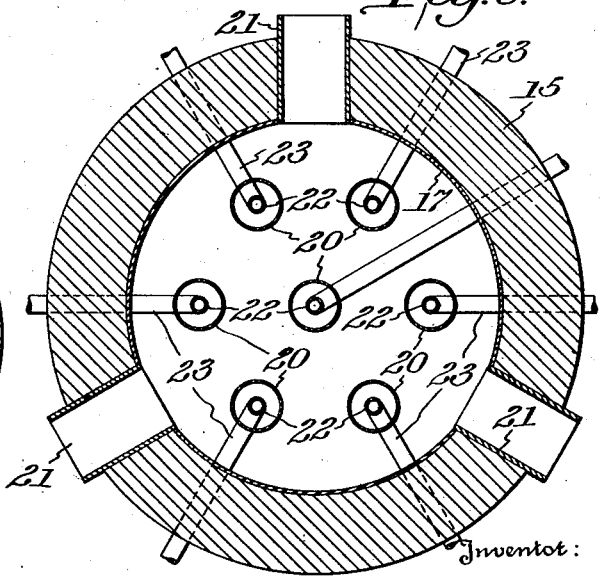

2,022,778

UNITED STATES PATENT OFFICE 2,022,778

APPARATUS FOR THE PRODUCTION OF HOT REDUCING GASES

Charles G. Maier, Berkeley, Calif., assignor to Thomas B. Swift

Application January 18, 1933, Serial No. 652,371

6 Claims. (Cl. 23—288)

This invention relates to apparatus for the conversion of hydrocarbons into a gaseous product consisting essentially of carbon monoxide and hydrogen, substantially free of higher oxidation products, such as water vapor and carbon dioxide, and at a high temperature, suitable for use directly as a metallurgical heating and reducing agent. The apparatus is particularly designed for the conversion of natural gas into a highly heated metallurgical reducing gas and will be described and illustrated in that relation, it being apparent that it is equally adapted to the conversion of any hydrocarbon or mixture, whether normally gaseous or rendered gaseous by heat, and that the gas produced may be used for other purposes. This application is a continuation-in-part of my application Serial No. 609,965, filed May 7, 1932, in that it contains disclosure and claims divided out of said application, together with disclosure of and claims to certain modifications of said apparatus.

The principal fault of reducing gas mixtures consisting essentially of hydrogen and carbon monoxide heretofore produced from natural gas and similar hydrocarbons is that they contain amounts of the higher oxidation products, water and carbon dioxide, which render such gas mixtures unfit for certain metallurgical purposes, such as the reduction of iron ore to sponge iron. The carbon dioxide and water could be removed from the gas mixture by purification, but this operation is relatively expensive. An object of my invention, therefore, is to so conduct the oxidation of the hydrocarbon that a gas mixture substantially free of water vapor and carbon dioxide is produced directly.

The process which is carried out in the apparatus to be described hereinafter consists essentially in intimately mixing preheated dry air or other suitable oxygen containing gas, e. g. oxygen enriched air, with the gaseous hydrocarbon in substantially the proportions theoretically necessary to yield the desired reaction products, and while maintaining the velocity of the gases greater than the flame propagation rate, passing the mixture into a granular catalyst or contact mass and regulating the contact of the gases therewith in such manner as to prevent zoning of the oxidation reactions within the mass. It is quite important to avoid combustion or flame. The gas mixture produced contains, of course, the nitrogen derived from the air as a chemically inert but heat carrying ingredient.

The apparatus is illustrated in the accompanying drawings, in which:

Fig. 1 is a vertical section with parts appearing in elevation of one form of apparatus embodying my invention;

Figs. 2, 3, 4 and 5 are horizontal sections of the apparatus shown in Fig. 1 on the lines 2—2, 3—3, 4—4 and 5—5, respectively;

Fig. 6 is a vertical section of a modification of the apparatus illustrated in Figs. 1-5;

Fig. 7 is a horizontal section on the line 7—7 of Fig. 6;

Fig. 8 is a vertical section of an apparatus in which a plurality of the units illustrated in Fig. 6 are combined, and Fig. 9 is a horizontal section on the line 9—9 of Fig. 8.

Referring to Figs. 1-5 of the drawings, 1 is the air supply pipe and 2 the gas supply pipe, both narrowed to nozzles at their inner ends where they enter the substantially spherical mixing chamber 3 formed in the body of refractory material 4. The pipe 1 is surrounded by the pipe 5 which is provided with an entering flue 6 for flame or hot combustion gases. The refractory mass 4 is formed within the shell comprising the side wall 7 having an opening to receive the pipe 2, the end wall 8 having an opening to receive the pipe 1 and the grating 9. The pipes 1, 2 and 5, flue 6, the side wall 7, and wall 8 and grating 9 preferably are formed of a suitable refractory alloy such as the well-known chrome-nickel steels. The refractory mass 4 may be formed of any suitable material, such as crystalline alumina or magnesia cement molded or tamped into place so as to surround the ends of the pipes 1 and 2 and leave the spherical cavity 3 and the semi-ellipsoidal cavity 10 which communicate through the orifice 11. Directly below the orifice 11 within the cavity 10 is the deflector 12 which is thimble shaped and formed of suitable refractory material, such as magnesia cement. Gases leaving the chamber 3 through the orifice 11 pass into the cavity of the deflector 12 and flow over its upper edge and then downwardly through the porous catalytic mass 13. The deflector 12 is supported in the catalytic mass 13 which fills the cavity 10 excepting the space within the deflector 12 and above its upper edge. The catalytic mass 13 may be any suitable oxidation catalyst, such as a granular refractory material, e. g. porous crystalline alumina impregnated with nickel salts or nickel oxide. The whole structure above described is surrounded by the refractory and heat insulating mass 14.

The form of apparatus illustrated in Figs. 6 and 7 differs from the apparatus illustrated in Figs. 1 to 5 principally in that the mixing chamber 3 is dispensed with. Other differences in the details of construction will appear from the following description:

Referring to Figs. 6 and 7, the apparatus comprises an outer insulating wall 15 surrounding a substantially cylindrical shaft, the upper portion of which is walled by the refractory shell 16 and the lower portion of which is lined by the shell of refractory alloy, such as chrome nickel steel 17. The lower end of the shell 17 is closed by the grating 18 and communicates with the funnel shaped member 19 designed to deliver the gases into a tubular conduit (not shown). Air is supplied through and preheated in pipe 20 by heating gases supplied through the flue 21. The heated air enters the open upper end of the pipe 22 and passing downwardly therethrough mixes with the hydrocarbon gas supplied through the pipe 23. The mixture discharges from the pipe 22 through the orifice 24 into the cavity of the thimble shaped deflector 25. The thimble 25 is supported in and surrounded by the catalytic or contact material 26 which also supports and surrounds the inverted cup shaped member 27 and fills the space within the shell 17 up to the wall 28. The member 27 like the thimble 25 is made of refractory material. It contains the orifice 24 and is so shaped and positioned with respect to the thimble 25 as to provide a passageway for the gases through the contact material 26 of progressively increasing cross-sectional area. As will be apparent, the apparatus illustrated in Fig. 6 functions in substantially the same manner as the apparatus of Fig. 1, the differences being differences of construction only.

The apparatus illustrated in Figs. 8 and 9 is a grouping of seven of the units shown in Figs. 6 and 7 within a single outer wall 15. The units have in common the wall 15, shell 16, shell 17, grating 18, funnel 19, catalytic mass 26 and wall 28.

In the operation of the apparatus illustrated in Figs. 1 to 5, hydrocarbon gas and preheated air enter the chamber 3 through pipes 2 and 1, the air being preheated to a temperature of 800–1000° C. by hot combustion gases or flame entering through the pipe 6 and passing up through the pipe 5 in contact with the pipe 1. The nozzle ends of pipes 1 and 2 are made of such size that they deliver the gas and air into the chamber 3 in proper proportion and at a velocity exceeding the flame propagation rate. The gas and air streams impinging in the chamber 3 are efficiently mixed and the mixing is made more complete by the passage of the mixture through the orifice 11, and its movement into and out of the cavity of the deflector 12 and over its upper edge downwardly into the catalytic mass. The sizes of the chamber 3, orifice 11, the cavity in the deflector 11 and the passageway between the upper edge of the deflector 12 and the wall of cavity 10 and between the outer wall of the deflector 12 and the adjacent wall of the cavity 10 are such that the flow of the gases exceeds the flame propagation rate until the gases reach a point about half way down the outer wall of the deflector 12 in the catalytic mass. Under these conditions it is found that reaction zones and zones of concentration of heat do not occur, there is no local overheating and destruction of the catalytic mass and other parts of the apparatus, and secondary reactions converting any carbon dioxide and water resulting from the primary reaction into carbon monoxide and hydrogen are completed.

The deflector 12 performs several important functions. As indicated above it plays a quite important part in the mixing of the gas and air. In starting the apparatus a flame is apt to be formed at the orifice 11 and the deflector protects the catalytic mass from this flame until the operation is properly adjusted. An exothermic reaction occurs in the cavity of the deflector and the heat of this reaction is harmlessly transmitted through the mass of the deflector to the catalytic mass. It also serves to catch dirt particles accidentally in the air and gas and prevent them from depositing upon the catalytic mass and clogging its pores.

An important feature of the invention is that the mixture of air and gas is brought into contact with the porous catalytic mass at reacting temperature, but without flame, i. e. at a velocity higher than the velocity of flame propagation, and then gradually slowed down within the catalytic mass by virtue of its shape, i. e. its gradually increasing cross-section in the path of the gases. As a result the exothermic and endothermic stages of the reaction take place virtually simultaneously and the zoning with overheating at one point and a deficiency of heat for completing the reaction at another point in the catalytic mass is avoided. As is evident, if the highly exothermic stage of the reaction were permitted to take place before the gas mixture reached the catalytic mass the result would be a flame which would strike the catalytic mass and destroy it. On the other hand, if the high velocity of the gases exceeding the rate of flame propagation were maintained through the catalytic mass the reductions would not be completed.

In the apparatus illustrated in Figs. 6 and 7, the nozzled air and gas conduits and the mixing chamber 3 are dispensed with, the air and gas being mixed at the junction of pipes 22 and 23. Otherwise the operation of this apparatus is the same as that illustrated in Figs. 1 to 5. The operation of the multiple unit embodiment illustrated in Figs. 8 and 9 will be apparent from the foregoing description of the operation of the single unit.

The following specific conditions of operation are illustrative. The pipe 1 is made of 10 gauge alloy steel 2 inches in diameter and 5 feet long, nozzled at one end to an orifice ½ inch in diameter. The pipe 2 is of the same material and ¾" diameter, but nozzled to a ⅜ inch orifice. The chamber 3 is 1½ inches in diameter and the orifice 11 is ¼ inch in diameter. The cavity 10 is 7 inches long and 6 inches in diameter at the grating 9. The deflector thimble is 3½ inches long, 1¼ inches maximum internal diameter and 2¼ inches maximum external diameter. The catalyst is crystalline alumina of 4 to 10 mesh size impregnated with nickel. Air is delivered into the chamber 3 at 900° C. and at the rate of 100 liters per minute and natural gas is delivered at the rate of 35 liters per minute, both gas and air under a gauge pressure of about 2 pounds per square inch. The gas passing out through the grating 9 is at a temperature of 1050–1100° C. The analysis of the natural gas used is:

| | Percent |
|---|---|
| Methane | 86.85 |
| Ethane ($C_2H_6$) | 7.86 |
| Propane ($C_3H_8$) | 3.87 |
| Higher paraffine hydrocarbons | 1.47 |

The gas produced is of the following composition:

| | Percent |
|---|---|
| Methane ($CH_4$) | 0.5 |
| Carbon dioxide ($CO_2$) | 0.9 |
| Water ($H_2O$) | 0.9 |
| Carbon monoxide (CO) | 19.3 |
| Hydrogen ($H_2$) | 36.4 |
| Nitrogen | 41.9 |

It is understood that the composition and temperature of the gas produced may vary with the composition of the hydrocarbon or mixture used, the composition of the air or oxygen containing gas used in place of air, as well as by the operation of the process, including such factors as the efficiency of the catalyst, the accuracy of the adjustment of the gas and air supplied, etc., but in general it is possible to produce a gas at a temperature in the neighborhood of 1000° C. containing negligible amounts of hydrocarbon, and the higher oxidation products, water vapor and carbon dioxide, and consisting essentially of carbon monoxide and hydrogen with nitrogen.

It will be understood that the operation of my apparatus avoids the use of an excess of air for supplying the necessary heat for carrying on the reaction by combustion with consequent pollution of the gases with combustion products as in certain prior attempts to produce a combustible or reducing gas mixture by the partial oxidation of hydrocarbons in the presence of catalysts. I supply the necessary heat without the use of an excess of air by preheating the air supply, and I avoid the difficulty heretofore encountered by others in preheating the air supply, e. g. that excessively high local temperatures are produced in the catalytic mass, by intimately mixing the reacting gases and passing the mixture to and through the catalytic mass at such a regulated speed that the exothermic and endothermic stages of the reaction occur essentially together in the absence of flame so that spatially separated zones of reaction are avoided. A temperature of at least about 1000° C. is maintained in the catalytic mass and the air supply is heated to about 800–1000° C.

It is observed that the essential characteristics of the apparatus illustrated and described above may be preserved while making certain changes in the details of construction without departing from my invention.

1. Apparatus for the conversion of hydrocarbons into gas mixtures consisting essentially of carbon monoxide and hydrogen and being substantially free of carbon dioxide and water by reaction with an oxygen containing gas, comprising a porous refractory catalytic mass of progressively increasing cross-sectional area in the direction of flow of gases therethrough and having a free surface at the location of its smallest cross-sectional area, and means for supplying a highly heated mixture of hydrocarbon gas and oxygen containing gas to said catalytic mass through said free surface comprising separate conduits for the oxygen containing gas and the hydrocarbon gas, means for heating the conduit for the oxygen containing gas, means for bringing said oxygen containing gas and hydrocarbon gas together at high velocity, means for delivering a stream of the resulting gas mixture at high velocity to said catalytic mass and means for preventing direct impingement of said stream directly upon the catalytic mass.

2. Apparatus for the controlled oxidation of hydrocarbons comprising a porous refractory catalytic mass of progressively increasing cross-sectional area throughout its length in the direction of flow of gases therethrough, separate supplies of hydrocarbon gas and air, means for heating the air supply, means for intimately mixing the hydrocarbon and air, means for delivering a stream of the resulting mixture to the catalytic mass, and a deflector preventing impingement of said stream directly upon the catalytic mass.

3. Apparatus for the controlled oxidation of hydrocarbons as defined in claim 1 in which said means for intimately mixing the hydrocarbon and air comprises nozzled conduits delivering into a substantially spherical mixing chamber.

4. Apparatus for the controlled oxidation of hydrocarbons as defined in claim 1 in which the means for mixing the hydrocarbon and air comprises nozzled conduits delivering into a substantially spherical mixing chamber, and an orifice in said chamber through which the gas mixture is delivered to the catalytic mass.

5. Apparatus as defined in claim 2 in which the deflector is thimble shaped with is convex side in contact with the catalytic mass and its concave side in the line of movement of said stream.

6. Apparatus for the controlled combustion of hydrocarbons comprising a porous catalytic mass, a thimble shaped member formed of impervious refractory material having its convex side only in contact with said mass, a cup shaped member formed of impervious refractory material positioned with its concave side opposed to the concave side of said thimble shaped member and its side walls overlapping the side walls of said thimble shaped member, the space between said walls defining a space filled with catalytic mass of progressively increasing cross-sectional area and, an opening in one of said members for the introduction of a fluid stream into the space defined by the opposed concave surfaces of said members.

CHARLES G. MAIER.